United States Patent
Ou et al.

(10) Patent No.: US 12,265,191 B2
(45) Date of Patent: Apr. 1, 2025

(54) METHOD FOR CARRIER DISTORTION COMPENSATION IN MWD MUD PULSE TELEMETRY

(71) Applicant: Institute of Geology and Geophysics, Chinese Academy of Sciences, Beijing (CN)

(72) Inventors: Jing Ou, Beijing (CN); Jiansheng Du, Beijing (CN); Wenxiu Zhang, Beijing (CN); Xinzhen He, Beijing (CN); Xiaolong Li, Beijing (CN); Yuliang Wang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 108 days.

(21) Appl. No.: 18/244,562

(22) Filed: Sep. 11, 2023

(65) Prior Publication Data

US 2024/0264325 A1    Aug. 8, 2024

(30) Foreign Application Priority Data

Feb. 8, 2023   (CN) .......................... 202310083608.4

(51) Int. Cl.
*G01V 1/36* (2006.01)
*G01V 1/22* (2006.01)

(52) U.S. Cl.
CPC ............... *G01V 1/362* (2013.01); *G01V 1/22* (2013.01); *G01V 2200/16* (2013.01); *G01V 2210/32* (2013.01)

(58) Field of Classification Search
CPC ...... G01V 1/362; G01V 1/22; G01V 2200/16; G01V 2210/32; E21B 47/18
See application file for complete search history.

(56) References Cited

U.S. PATENT DOCUMENTS

| | | |
|---|---|---|
| 11,255,187 B1 | 2/2022 | Chen |
| 2003/0117896 A1* | 6/2003 | Sakuma ................. H04B 11/00 367/81 |

(Continued)

FOREIGN PATENT DOCUMENTS

| | | | |
|---|---|---|---|
| CN | 101949287 A | * | 1/2011 |
| CN | 106089188 A | | 11/2016 |

(Continued)

OTHER PUBLICATIONS

Office Action for CN Application No. 202310083608.4 dated Mar. 31, 2023 (9 pages).

(Continued)

*Primary Examiner* — Amine Benlagsir
(74) *Attorney, Agent, or Firm* — Meister Seelig & Fein PLLC

(57) ABSTRACT

The present application discloses a carrier wave distortion compensation method for an MWD mud continuous wave system, comprising: in the downhole, modulating the carrier wave according to the transmission data to obtain a mud continuous wave signal to be transmitted; transmitting the mud continuous wave signal to the ground via a mud channel; denoising the received pressure signal on the ground to obtain a denoised mud continuous wave signal; performing subsequent processing on the denoised mud continuous wave signal to obtain the final transmission data; and performing downhole distortion compensation before modulating the carrier wave or performing ground distortion compensation on the denoised mud continuous wave signal before performing subsequent processing. The present application reduces the bit error rate of the MWD mud continuous wave system by performing waveform distortion compensation prior to downhole modulation or during performing signal processing on the ground.

7 Claims, 8 Drawing Sheets

(56) References Cited

U.S. PATENT DOCUMENTS

| | | | | |
|---|---|---|---|---|
| 2003/0142586 A1* | 7/2003 | Shah | .................... | G01V 11/002 |
| | | | | 340/853.2 |
| 2003/0151977 A1* | 8/2003 | Shah | ...................... | E21B 47/18 |
| | | | | 340/854.4 |
| 2003/0185100 A1* | 10/2003 | D'Angelo | ............ | G01N 29/222 |
| | | | | 367/82 |
| 2008/0060848 A1* | 3/2008 | Pastusek | ................. | E21B 21/08 |
| | | | | 175/40 |
| 2008/0133982 A1* | 6/2008 | Rawlins | ............... | H04B 1/0475 |
| | | | | 714/699 |
| 2010/0008188 A1* | 1/2010 | Hall | ........................ | E21B 44/00 |
| | | | | 705/400 |
| 2011/0028101 A1* | 2/2011 | Phan Huy | ............. | H04L 27/368 |
| | | | | 455/67.11 |
| 2014/0341388 A1* | 11/2014 | Goldstein | ........ | G10K 11/17827 |
| | | | | 381/71.11 |
| 2015/0345287 A1 | 12/2015 | White | | |
| 2017/0260851 A1* | 9/2017 | Rendusara | .............. | F04D 13/10 |
| 2019/0052374 A1* | 2/2019 | Lie | ....................... | H04B 17/345 |
| 2019/0113439 A1* | 4/2019 | San Martin | ........... | E21B 47/006 |
| 2019/0389505 A1* | 12/2019 | Pramod | .................... | H02P 6/17 |

FOREIGN PATENT DOCUMENTS

| | | | |
|---|---|---|---|
| CN | 106850477 A | 6/2017 | |
| CN | 107795317 A | 11/2020 | |
| CN | 107465399 A | 6/2023 | |

OTHER PUBLICATIONS

Office Action for CN Application No. 202310083608.4 dated Apr. 20, 2023 (4 pages).

* cited by examiner

METHOD FOR CARRIER DISTORTION COMPENSATION IN MWD MUD PULSE TELEMETRY

TECHNICAL FELD

The present application relates to the field of communications, and more particularly to a method for carrier distortion compensation in MWD mud pulse telemetry.

BACKGROUND ART

In recent years, in order to further improve the well drilling efficiency, the real-time logging information, such as the orientation, formation characteristics, well drilling parameters, etc. that need to be transmitted by a measure while drilling (MWD) system, shows explosive growth. The low transmission rate of the traditional positive and negative pulse transmission system has become the bottleneck problem restricting the development of the MWD mud pulse telemetry system. In order to meet the increasing information demand, the technology of using a shear valve to realize mud continuous wave has emerged, which improves the data transmission rate of the MWD system and has gradually become a promising technology.

The MWD mud continuous wave system achieves the interception effect of the mud through the continuous motion of an electric motor rotor, and forms a continuous pressure wave. The maximum oscillation frequency of the rotor of the rotary valve of the electric motor can reach 40 Hz, and the carrier wave modulation is carried out by using various modulation modes such as ASK (Amplitude-shift Keying), FSK (Frequency-shift keying), and PSK (Phase-shift keying), so that the transmission rate of 40 bps can be implemented. Compared with the maximum transmission rate of 5 bps of positive and negative pulse transmission system, the MWD mud continuous wave system can meet the increasing demand for downhole data transmission.

In an MWD mud continuous wave system, how to achieve the expected mud pressure wave waveform is one of the important technologies to ensure the high-speed transmission of the system. Currently, MWD mud continuous wave systems achieve real-time transmission of digital signals by sending quasi-sinusoidal waves.

In practical applications, because of the carrier wave distortion in the MWD mud continuous wave system, the bit error rate of the system is much higher than that of traditional communication systems using electromagnetic waves as carriers, which leads to poor noise immunity and shallow transmission depth of the MWD mud continuous wave system. These shortcomings restrict the use and development of MWD mud continuous wave systems.

SUMMARY OF THE INVENTION

The present application proposes a carrier wave distortion compensation method for the MWD mud continuous wave system. The method designs a downhole given rotor speed equation based on the generation principle of a mud continuous wave signal, so that the generated mud continuous wave pressure waveform distortion is reduced and the bit error rate of the MWD mud continuous wave system is reduced, thereby achieving the improvement of noise immunity and transmission depth. Furthermore, subject to the constraints of the computational complexity of the downhole hardware system, the present application proposes that the mud continuous wave carrier wave distortion compensation can be performed at the ground receiving end, so as to achieve the improvement of the bit error rate without increasing the complexity of the downhole hardware system.

The present application provides a carrier wave distortion compensation method for the MWD mud continuous wave system, including:
 in the downhole, modulating a carrier wave according to transmission data to obtain a mud continuous wave signal to be transmitted;
 transmitting the mud continuous wave signal to the ground via a mud continuous wave channel;
 denoising a received pressure signal on the ground to obtain a denoised mud continuous wave signal; and
 performing subsequent processing on the denoised mud continuous wave signal to obtain the final transmission data;
 wherein downhole distortion compensation is performed on the carrier wave before modulating the carrier wave or ground distortion compensation is performed on the denoised mud continuous wave signal before performing subsequent processing on the denoised mud continuous wave signal.

Preferably, the downhole distortion compensation is implemented by correcting the waveform of the carrier wave.

Preferably, the correction of the waveform of the carrier wave is implemented by correcting the control signal of the rotor rotation speed of the pulser.

Preferably, ground distortion compensation is implemented by correcting the denoised mud continuous wave signal.

Preferably, denoising a received pressure signal to obtain a denoised mud continuous wave signal specifically comprises:
 learning a pump noise frequency by a pump stroke sensor to generate a reconstructed pump noise waveform; and
 subtracting the reconstructed pump noise waveform from the pressure signal and obtaining the denoised mud continuous wave signal.

Preferably, denoising a received pressure signal further comprises eliminating noises generated by a motor.

Preferably, the subsequent processing comprises matched filtering, synchronization, equalization, and demodulation and decoding on the ground.

Preferably, the ground equalization comprises:
 training a decision feedback equalizer by using a fixed codeword to obtain an equalization coefficient; and
 adjusting the equalization coefficient by recursive least square (RLS) or least mean square (LMS) to achieve adaptive equalization.

Preferably, the demodulation is implemented by means of coherent demodulation or non-coherent demodulation.

Preferably, the decoding is implemented by means of hard-decision decoding.

Other features and advantages of the present application will become apparent from the following detailed description of exemplary embodiments of this application with reference to the accompanying drawings.

BRIEF DESCRIPTION OF THE DRAWINGS

The accompanying drawings, which are incorporated into and form a part of the present application illustrate embodiments of this description and are used together with their explanations to explain the principles of the present application.

DETAILED DESCRIPTION OF THE INVENTION

Various exemplary embodiments of the present application will now be described in detail with reference to the accompanying drawings. It should be noted that the relative arrangement of the components and steps, the numerical expressions and values set forth in these embodiments do not limit the present application, unless otherwise specifically illustrated.

The description of at least one exemplary embodiment below is actually only illustrative and does not serve as any limitation on the present application, and the application or use thereof.

Techniques, methods, and devices known to those of ordinary skill in the relevant art may not be discussed in detail, but the techniques, methods, and devices should be considered part of the description where appropriate.

In all examples shown and discussed herein, any particular value should be interpreted as illustrative only and not as limiting. Therefore, other examples of exemplary embodiments may have different values.

The MWD mud continuous wave system is divided into a downhole portion and a ground portion. The downhole portion mainly includes modules such as a continuous wave generator (specifically a pulser), a motor control circuit board, an attitude measurement probe tube, a downhole central control unit, and a power supply; the ground portion mainly consists of modules such as ground pressure sensors, a ground data processing unit, a decoding unit, and a control unit. The downhole portion generates an expected mud continuous wave signal by controlling the pressure of the mud (drilling fluid), the mud continuous wave signal is transmitted through the mud to the ground, and the ground portion performs data processing on the pressure signal received by the ground pressure sensor, followed by restoring the sent data by decoding.

The present application provides a carrier wave distortion compensation method for the MWD mud continuous wave system. By performing waveform distortion compensation before downhole modulation or during performing signal processing on the ground, the carrier wave accuracy in the MWD mud continuous wave system is improved, thereby reducing the bit error rate of the MWD mud continuous wave system, and achieving the improvement of noise immunity and transmission depth.

Embodiment 1

Figure 1:
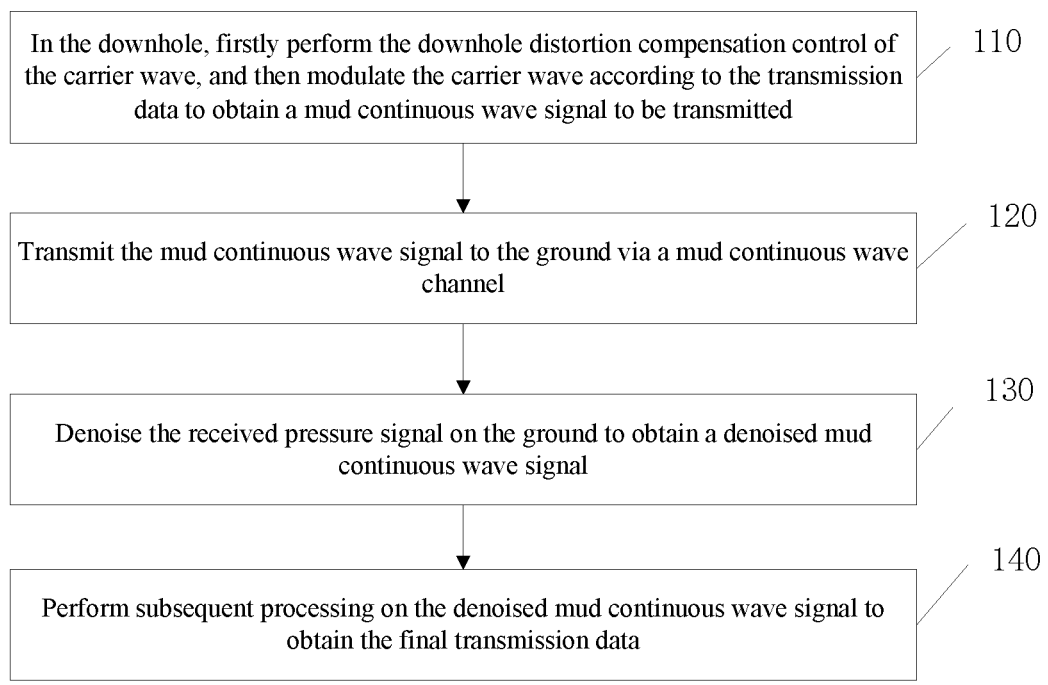
FIG. 1 is a flow chart of the first embodiment of a carrier wave distortion compensation method for the MWD mud continuous wave system provided by the present application.

As shown in FIG. 1, a carrier wave distortion compensation method of the MWD mud continuous wave system provided by the present application includes:

S110: in the downhole, firstly performing the downhole distortion compensation control of the carrier wave, and then modulating the carrier wave according to the transmission data to obtain a mud continuous wave signal to be transmitted.

Specifically, in the downhole, the downhole central control unit sends information, such as an encoding mode setting, frame structure, and data rate, to a motor control circuit board. The motor control circuit board uses a preset downhole distortion compensation strategy to generate a control signal for the pressure difference between the stator and the rotor of the pulser, and an expected modulated waveform is generated after modulation.

As one embodiment, the waveform may be modulated by ASK, FSK, PSK, etc.

Binary phase shift keying (BPSK) modulation is used as an example to describe downhole distortion compensation in detail as follows.

Theoretically, in a BPSK modulation system, the modulation signal y' is represented as:

$$y' = \cos(\omega'(t) + \varphi_i) \quad (1)$$

$$\varphi_i = \begin{cases} 0 & \text{when } a(n) = 0 \\ \pi & \text{when } a(n) = 1 \end{cases}$$

where a(n) represents transmission data (0 codeword or 1 codeword), and $\cos(\omega'(t))$ represents the carrier wave and is a standard sinusoidal wave.

Figure 2:
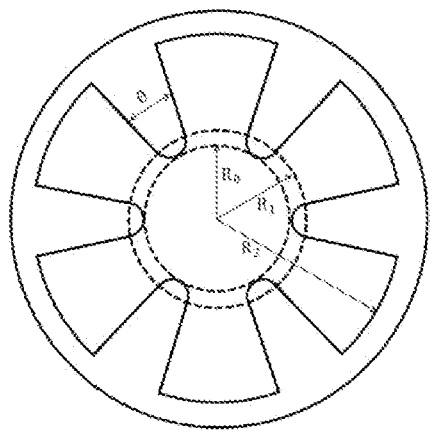
FIG. 2 is a schematic diagram of a rotor structure of a pulser of the MWD mud continuous wave system.

In the MWD mud continuous wave system, the structure of the rotor of a pulser is as shown in FIG. 2, where $R_0$, $R_1$, and $R_2$ are the characteristic radius of the stator and the unit is m; and θ is the included angle of the rotor blade, and the unit is (°).

In the prior art, the fluid flow through the pore area between the rotor and the stator of the pulser can be expressed as:

$$Q = C_d A \sqrt{\frac{2\Delta p}{\rho}} \quad (2)$$

where $C_d$ is the flow coefficient, A is the pore area, Q is the flow through the pore area, ρ is the density of the liquid, and Δp is the pressure difference between two sides of the gap, i.e. the pressure signal output by the pulser. The following can be obtained by the above formula:

$$\Delta p = \frac{\rho Q^2}{2C_d^2} \times \frac{1}{A^2} \quad (3)$$

According to the schematic diagram of the rotor of the pulser shown in FIG. 2, the maximum area $A_{max}$ through which the fluid can flow can be obtained:

$$A_{max} = \frac{6\theta\pi(R_2^2 - R_1^2)}{360} + 3\pi(R_1 - R_0)^2 + \pi(d^2 + 2R_2 d) \quad (4)$$

where d is the gap width between the outer ring of the rotor and the inner wall of the drill pipe, and the unit is m.

When the pulser is running, the flow area A(t) is:

$$A(t) = A_{max} - \frac{1}{2}(R_2^2 - R_1^2) \times 6 \int_0^t \omega(t) dt \quad (5)$$

where ω(t) is the angular velocity of the rotor rotation of the pulser, and the unit is rad/s, and it can be expressed as follows:

$$\omega(t) = \frac{\pi^2 f \theta}{180} \times s(t) \quad (6)$$

where f is the rotational frequency of the rotor, and the unit is Hz; and s(t) is a control signal (hereinafter referred to as a given signal) of the rotational speed of the rotor.

Therefore, the flow area when the pulser is running is:

$$A(t) = A_{max} - \frac{\pi^2 f \theta (R_2 - R_0)}{60} \int_0^t s(t) dt \quad (7)$$

It can be derived from the above formula that the relationship between the pressure signal Δp output by the pulser and the given signal s(t) is as follows:

$$\Delta p = \frac{\rho Q^2}{2C_d^2} \times \frac{1}{A^2} \quad (8)$$

$$= \frac{\rho Q^2}{2C_d^2} \times \frac{1}{\left(A_{max} - \frac{\pi^2 f \theta (R_2 - R_0)}{60} \int_0^t s(t) dt\right)^2}$$

As can be seen from the above formula, in the prior art, the pressure signal Δp has a non-linear relationship with the given signal s(t). When the input signal is a sinusoidal signal, the output pressure signal (i.e. the carrier wave) of the pulser is shown as a solid line in FIG. 3.

Figure 3:
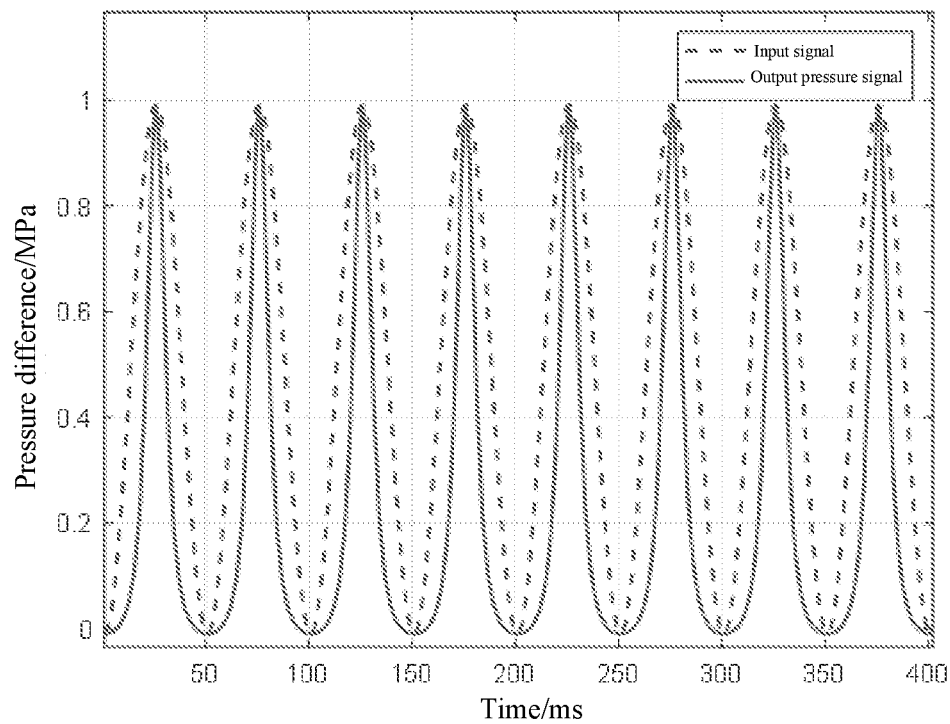
FIG. 3 is a waveform diagram of an output carrier wave signal of the MWD mud continuous wave system according to the prior art.

As can be seen from FIG. 3, the pulser output waveform produces a non-linear distortion that will cause the carrier in the MWD mud continuous wave system to be a non-sinusoidal-wave.

Figure 4:
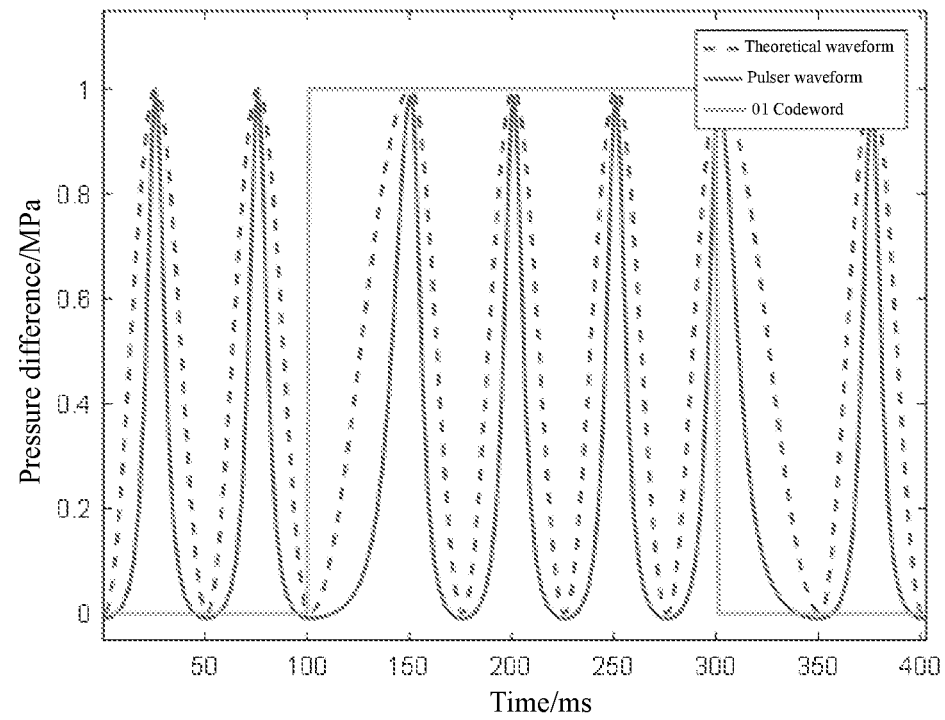
FIG. 4 is a BPSK modulated waveform diagram of the MWD mud continuous wave system according to the prior art.

When using BPSK modulation, the sending waveform in the MWD mud continuous wave system (i.e. the waveform after BPSK modulation) is as shown in FIG. 4. Compared to the conventional BPSK, when using mud as the propagation medium, the phase of the signal must be continuous. At that, a transition period is required, resulting in a loss of system performance.

Figure 5:
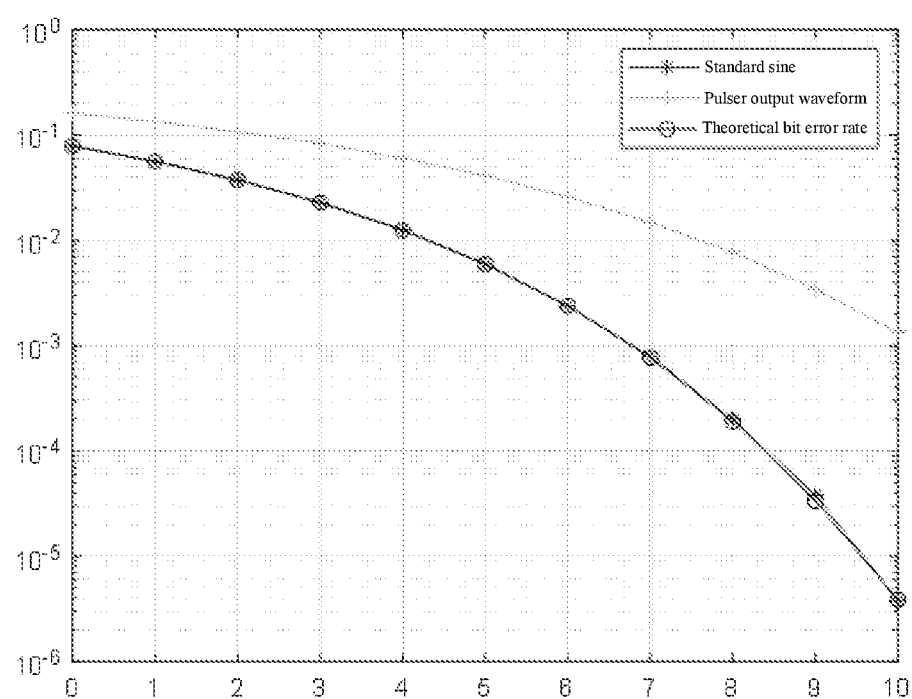
FIG. 5 is a BPSK bit error rate of the MWD mud continuous wave system according to the prior art.

In addition, due to the non-linear distortion of the output waveform, which is not a standard sinusoidal wave, the system bit error rate will deteriorate under the same signal-to-noise ratio. The impact of this nonlinearity on the transmission performance is as shown in FIG. 5. It needs to be noted that in FIG. 5, the theoretical bit error rate is a bit error rate curve obtained by formula derivation by taking a standard sinusoidal wave as the carrier wave, and thus the theoretical bit error rate in the figure substantially coincides with the simulated bit error rate curve using a standard sine as the carrier wave.

Based on the foregoing, in this embodiment, downhole distortion compensation is implemented by correcting the waveform of the carrier wave before modulating the carrier wave so as to reduce the distortion so that the output waveform of the pulser is closer to a sinusoidal wave.

Specifically, the correction of the waveform of the carrier wave is implemented by correcting the control signal of the rotor rotation speed of the pulser, (i.e. the given signal), to obtain carrier waveform after distortion compensation.

Specifically, in order to make the target pressure signal Δp more similar to a sinusoidal curve, distortion compensation needs to be performed on the given signal s(t), and assuming that the compensation function is f(x), then the target pressure signal Δp can be obtained as:

$$\Delta p = \frac{\rho Q^2}{2C_d^2} \times \frac{1}{\left(A_{max} - \frac{\pi^2 f \theta (R_2 - R_0)}{60} \int_0^t f(s(t)) dt\right)^2} \quad (9)$$

In this embodiment, $$f(x) = \frac{\sin(2\pi ft)}{2\sqrt{\cos(2\pi ft) + 1}},$$

and the target pressure signal Δp is as follows:

$$\Delta p = \frac{A_{max}}{\left(\frac{\rho Q^2}{2C_d^2} + \frac{\pi^2 f \theta (R_2 - R_0)}{60}\left(\sqrt{\cos 2\pi ft} - 1\right)\right)^2} \quad (10)$$

Figure 6:
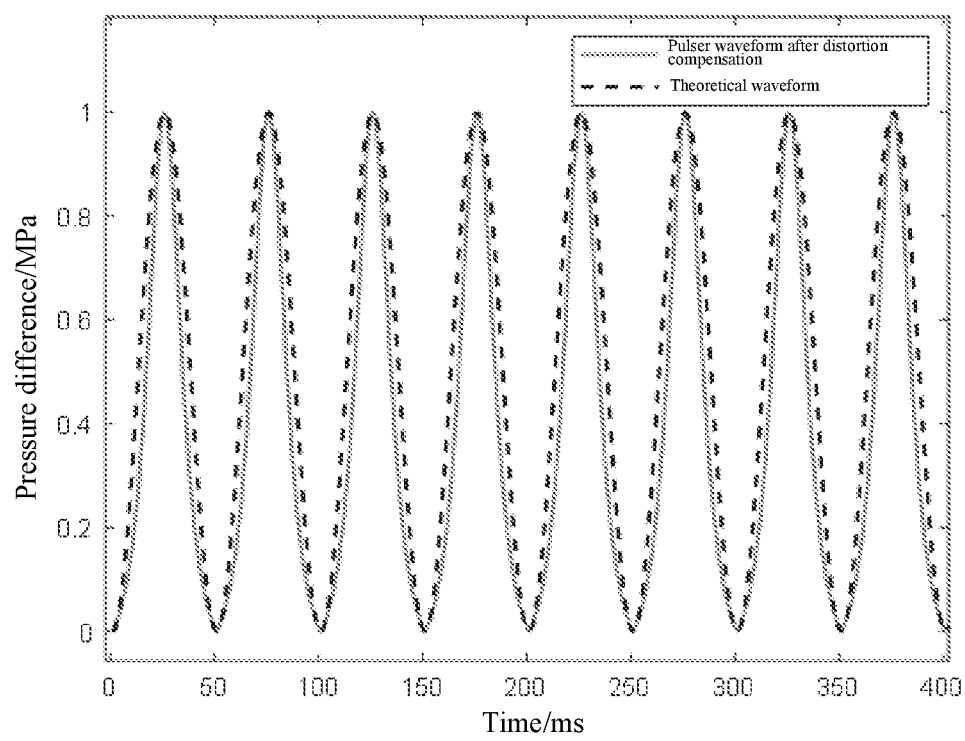
FIG. 6 is a waveform diagram of an output carrier wave signal after downhole distortion compensation of the MWD mud continuous wave system provided by the present application.
Figure 7:
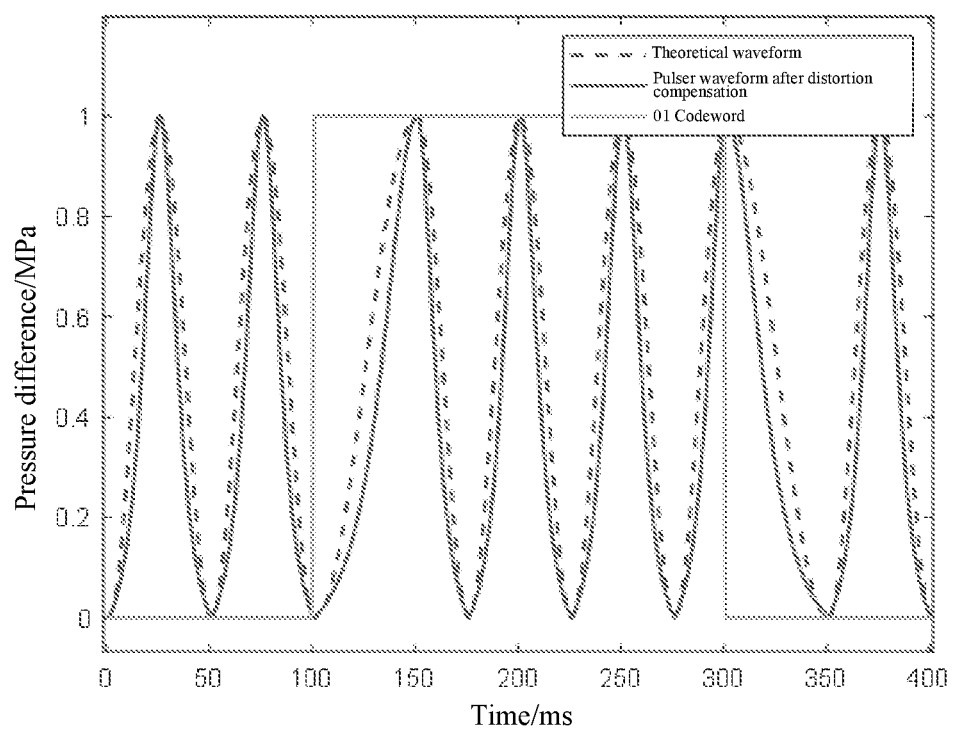
FIG. 7 is a diagram of BPSK modulation waveform after downhole distortion compensation of the MWD mud continuous wave system provided by the present application.
Figure 8:
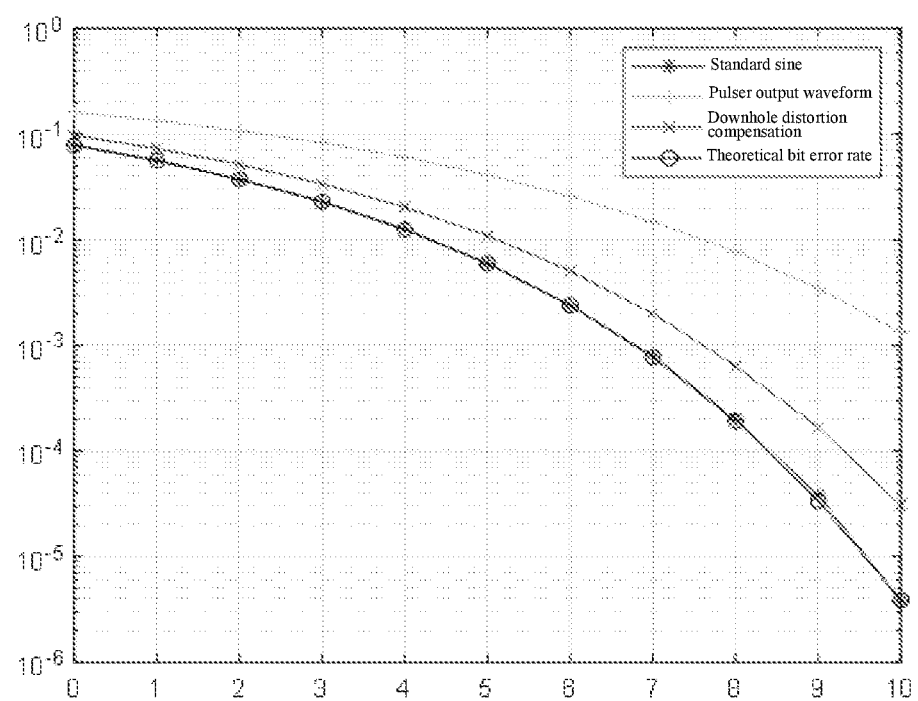
FIG. 8 is the BPSK bit error rate after downhole distortion compensation of the MWD mud continuous wave system provided by the present application.

At this time, the target pressure signal Δp (i.e. the output pressure signal of the pulser) is as shown in FIG. 6. It can be seen that the curve after downhole distortion compensation is significantly improved, closer to a sinusoidal wave in waveform. The BPSK modulation waveform after downhole distortion compensation is as shown in FIG. 7. In addition, using mud continuous carrier wave after downhole distortion compensation can significantly improve the system bit error rate at the same signal-to-noise ratio. The bit error rate after downhole distortion compensation is as shown in FIG. 8. It needs to be noted that in FIG. 8, the theoretical bit error rate is a bit error rate curve obtained by formula derivation by taking a standard sinusoidal wave as the carrier wave, and thus the theoretical bit error rate in the figure almost coincides with the simulated bit error rate curve using a standard sine as the carrier wave.

S120: transmit a mud continuous wave signal to the ground via a mud continuous wave channel.

The influence of the mud continuous wave channel on a useful signal is mainly divided into two parts: attenuation and interference. In the MWD mud continuous wave system, the attenuation of the useful signal amplitude increases rapidly with the increase of the well depth. The attenuation belongs to frequency selective fading. Channel fading is related to the elastic properties of the drill pipe, the friction between particles in the mud, the coefficient of compressibility of the mud, etc. Due to the influence of channel fading, the useful signal received by a ground pressure sensor will be distorted and needs to be eliminated by means of an equalizer, etc. uphole (the ground).

S130: denoise the received pressure signal on the ground to obtain the denoised mud continuous wave signal.

The MWD mud continuous wave system is mainly affected by pump noise, bit reflection, motor noise, and other interferences, so that digital signal processing is needed uphole to reduce the influence of the interference on the useful signal interpretation. On the ground, the MWD mud continuous wave system uses data signal processing technology to process the pressure signals collected by the ground pressure sensor to eliminate the influence of the pump noise and motor noise on the system.

As one embodiment, eliminating pump noise comprises the following steps:
P1: learning the pump noise frequency by a pump stroke sensor to generate the reconstructed waveform of pump noise; and
P2: by subtracting the reconstructed waveform of pump noise from the pressure signal, obtaining the denoised mud continuous wave signal.

S140: perform subsequent processing on the denoised mud continuous wave signal to obtain the final transmission data. Specifically, the subsequent processing includes matched filtering, synchronization, equalization, demodulation and decoding on the ground.

As one embodiment, the matched filtering specifically comprises:
Q1: filtering the denoised mud continuous wave signal according to the waveform of the first phase of the local carrier wave to obtain the first filtered waveform;
Q2: filtering the denoised mud continuous wave signal according to the waveform of the second phase of the local carrier wave to obtain the second filtered waveform; and
Q3: superimposing the first filtered waveform and the second filtered waveform to obtain a final filtered waveform.

In the ground synchronization process, the final filtered waveform is subjected to correlation processing with the local synchronous training codeword.

In the ground equalization, an equalizer is trained with a fixed codeword to obtain an equalization coefficient for use in data frame decoding. The equalizer may be implemented by using a filter that corrects and compensates for channel-generated characteristics by adjusting the parameters of the filter to reduce intersymbol interference. Specifically, a linear equalizer or a non-linear equalizer may be used for the implementation.

As one embodiment, a decision feedback equalizer is used to achieve ground equalization. Specifically, the ground equalization comprises:
R1: training a decision feedback equalizer by using a fixed codeword to obtain the equalization coefficient; and
R2: adjusting the equalization coefficient by RLS or LMS to achieve adaptive equalization.

During ground demodulation and decoding, demodulation is implemented through coherent demodulation or non-coherent demodulation, and then the 01 codeword is obtained through the decision, and then according to the coding scheme and frame structure composition set by the protocol, a corresponding parameter value is obtained.

As one embodiment, coherent demodulation is used to achieve demodulation. On this basis, hard decision decoding is used to achieve decoding.

Embodiment 2

Figure 9:
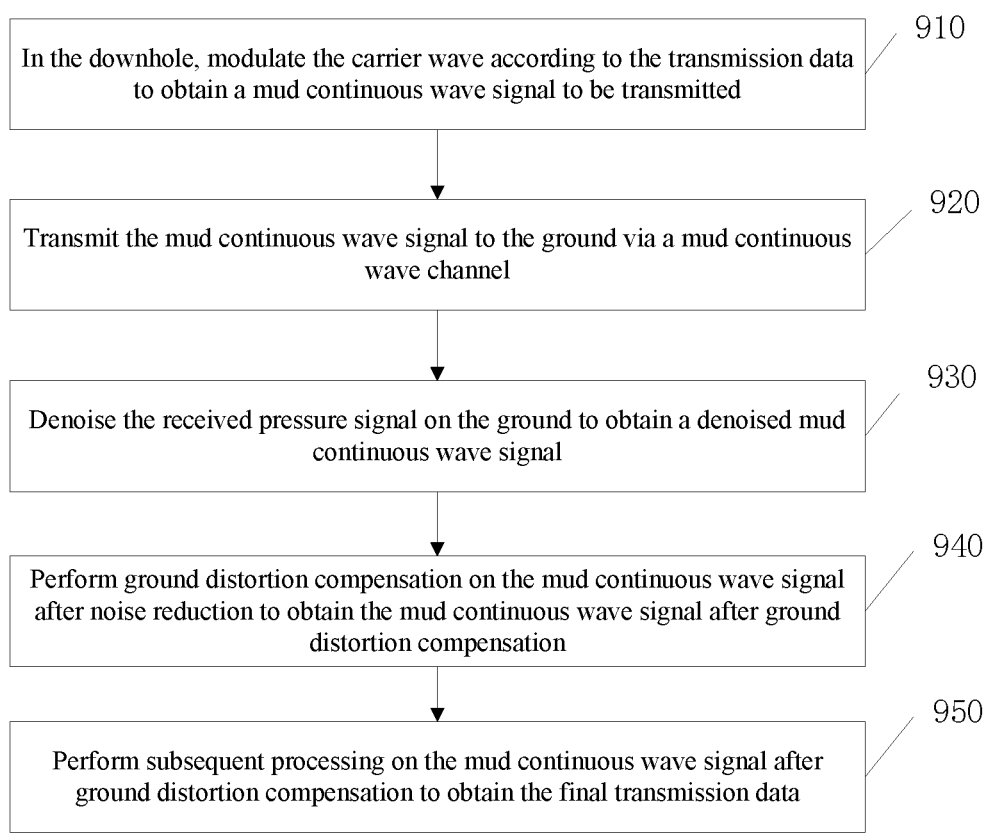
FIG. 9 is a flowchart of the second embodiment of the carrier wave distortion compensation method for the MWD mud continuous wave system provided by the present application.

FIG. 9 shows another embodiment of a carrier wave distortion compensation method for the MWD mud continuous wave system provided by the present application, which differs from the above-mentioned embodiments in that: 1, the downhole distortion compensation in step S110 is canceled, and a motor control circuit board uses a sinusoidal wave as a downhole given signal (please refer to formula (8)) to complete the control of the pressure difference between two ends of the stator and the rotor of the pulser, so as to generate the expected BPSK modulation waveform; and 2, before performing subsequent processing on the mud continuous wave signal after noise reduction, ground distortion compensation is performed on the mud continuous wave signal after noise reduction, and subsequent processing is performed on the mud continuous wave signal after ground distortion compensation to obtain the final transmission data.

Based on the above explanation, in this embodiment, the carrier wave distortion compensation method for the MWD mud continuous wave system includes:
S910: in the downhole, modulating the carrier wave according to the transmission data to obtain a mud continuous wave signal to be transmitted;
S920: transmitting the mud continuous wave signal to the ground via a mud continuous wave channel, seeing step S120 for details;
S930: denoising the received pressure signal on the ground to obtain the denoised mud continuous wave signal, seeing step S130 for details; and
S940: performing ground distortion compensation on the mud continuous wave signal after noise reduction to obtain the mud continuous wave signal after ground distortion compensation.

As one embodiment, ground distortion compensation is implemented by extracting the square root of the inverse of the denoised mud continuous wave signal.

Specifically, under the constraints of downhole hardware, in order to reduce the complexity of downhole calculation, the distortion compensation of the mud continuous wave carrier wave is performed at the ground receiving end. According to the above-mentioned formula (3), the mud continuous wave signal x obtained after denoising the pressure signal received by the ground pressure sensor is compensated to obtain the mud continuous wave signal y after the ground distortion compensation:

$$y = \frac{1}{\sqrt{x}} \quad (11)$$

Figure 10:
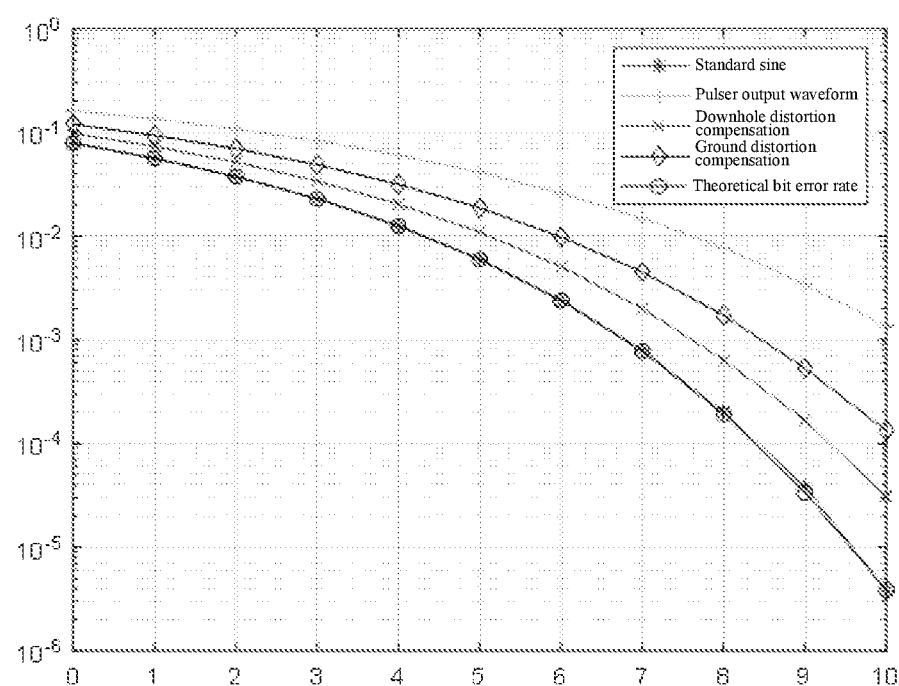
FIG. 10 shows the BPSK bit error rate after ground distortion compensation of the MWD mud continuous wave system provided by the present application.

The bit error rate after ground distortion compensation is as shown in FIG. 10. It can be seen from FIG. 10 that compared with the bit error rate of the original mud continuous wave system, the bit error rate after ground distortion compensation is significantly reduced.

S950: perform subsequent processing on the mud continuous wave signal after ground distortion compensation to obtain the final transmission data, seeing step S140 for details.

The present application designs a downhole given rotor speed equation base on the principle of generating a mud continuous wave signal to complete the pressure difference control between two ends of the stator and rotor, reducing the waveform distortion of the generated mud continuous wave signal. In addition, subject to the constraints of the computational complexity of the downhole hardware system, the present application proposes that the distortion compensation of the mud continuous wave signal can be performed at the ground receiving end. As a whole, the present application reduces the bit error rate of the MWD mud continuous wave system and improves the reliability of the system.

While some specific embodiments of the application have been described in detail by way of examples, it should be understood by those skilled in the art that the foregoing examples are illustrative only and are not intended to limit the scope of the application. Technicians in this field should understand that the above embodiments can be modified without departing from the scope and spirit of the present application. The scope of the present application is limited by the attached claims.

The invention claimed is:

1. A carrier wave distortion compensation method for an MWD mud continuous wave system, characterized by comprising:
   in a downhole, modulating a carrier wave according to transmission data to obtain a mud continuous wave signal to be transmitted;
   transmitting the mud continuous wave signal to a ground via a mud continuous wave channel;
   denoising a received pressure signal on the ground to obtain a denoised mud continuous wave signal; and
   performing subsequent processing on the denoised mud continuous wave signal to obtain a final transmission data;
   wherein a downhole distortion compensation is performed on the carrier wave before modulating the carrier wave and ground distortion compensation is performed on the denoised mud continuous wave signal before performing the subsequent processing on the denoised mud continuous wave signal; and
   the downhole distortion compensation is implemented by correcting a waveform of the carrier wave, wherein said correcting the waveform of the carrier wave is implemented by using a compensation function of a control signal of a rotor rotation speed of a pulser; and
   the ground distortion compensation is implemented by correcting the denoised mud continuous wave signal.

2. The carrier wave distortion compensation method for the MWD mud continuous wave system according to claim 1, characterized in that said denoising the received pressure signal to obtain the denoised mud continuous wave signal specifically comprises:
   learning a pump noise frequency by a pump stroke sensor to generate a reconstructed pump noise waveform; and
   subtracting the reconstructed pump noise waveform from the received pressure signal and obtaining the denoised mud continuous wave signal.

3. The carrier wave distortion compensation method for the MWD mud continuous wave system according to claim 2, characterized in that said denoising the received pressure signal further comprises eliminating noises generated by a motor.

4. The carrier wave distortion compensation method for the MWD mud continuous wave system according to claim 1, characterized in that the subsequent processing on the denoised mud continuous wave signal comprises matched filtering, synchronization, ground equalization, and demodulation and decoding on the ground.

5. The carrier wave distortion compensation method for the MWD mud continuous wave system according to claim 4, characterized in that the ground equalization comprises:
   training a decision feedback equalizer by using a fixed codeword to obtain an equalization coefficient; and
   adjusting the equalization coefficient by recursive least square (RLS) or least mean square (LMS) to achieve adaptive equalization.

6. The carrier wave distortion compensation method for the MWD mud continuous wave system according to claim 5, characterized by implementing the demodulation by means of coherent demodulation or non-coherent demodulation.

7. The carrier wave distortion compensation method for the MWD mud continuous wave system to claim 6, characterized in that the decoding on the ground is implemented by means of hard-decision decoding.

* * * * *